United States Patent
Nadkarni

(10) Patent No.: US 12,056,052 B2
(45) Date of Patent: Aug. 6, 2024

(54) DATA L2 CACHE WITH SPLIT ACCESS

(71) Applicant: Ampere Computing LLC, Santa Clara, CA (US)

(72) Inventor: Rahul Nadkarni, Cary, NC (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 17/809,886

(22) Filed: Jun. 29, 2022

(65) Prior Publication Data

US 2024/0004792 A1   Jan. 4, 2024

(51) Int. Cl.
*G06F 12/0811* (2016.01)

(52) U.S. Cl.
CPC .. *G06F 12/0811* (2013.01); *G06F 2212/1024* (2013.01)

(58) Field of Classification Search
None
See application file for complete search history.

(56) References Cited

U.S. PATENT DOCUMENTS

| | | | |
|---|---|---|---|
| 6,629,206 B1* | 9/2003 | Johnson | G06F 12/0864 711/131 |
| 2001/0029573 A1* | 10/2001 | Johnson | G06F 12/0864 711/140 |
| 2002/0194431 A1* | 12/2002 | Koo | G06F 12/0897 711/E12.043 |
| 2013/0132675 A1* | 5/2013 | Sleiman | G06F 12/0864 711/E12.024 |
| 2020/0183702 A1* | 6/2020 | Takagi | G06F 9/30036 |

* cited by examiner

*Primary Examiner* — Kaushikkumar M Patel
(74) *Attorney, Agent, or Firm* — Muncy, Geissler, Olds, & Lowe, P.C.

(57) ABSTRACT

A memory with data array (e.g., L2 cache) addressable in rows and columns and techniques to access data therein are proposed. Unlike conventional data arrays, the proposed memory allows data access to be initiated based on a row (or set) address even though the column (or way) address is not yet available. When the column address is determined, it can be used to select the correct data. Since the data access is started prior to determining the column address, memory access latency is reduced.

20 Claims, 18 Drawing Sheets

720

Initiate a data read from the data array during a first cycle based on a row address provided to the memory prior to the first cycle, the first cycle being a period of a first CLK signal — 810

Output a read data block at least by an end of a second cycle, the read data block being a data block of the plurality of data blocks corresponding to the row address and a column address, the second cycle being a period of a second CLK signal and subsequent to the first cycle, wherein the column address is not available prior to the first cycle — 820

| Op Cycle | 0 | 1 | 2 | 3 | 4 | 5 | 6 | 7 | 8 |
|---|---|---|---|---|---|---|---|---|---|
| L2 read - conventional | Set address to tag array | Begin tag read; Tags available at end of cycle | Tag ECC calculation; Update requestor / busy bits | Tag write | | | | | |
| | | | Tag compare: Hit calculation; Drive to data array – column address | | Data read | | Data ECC calculation | | |
| L2 read - proposed | Set address to tag array | Begin tag read; Tags available at end of cycle | Tag ECC calculation; Update requestor / busy bits | Tag write | | | | | |
| | | Set address to data array | Start read access; tag compare; drive to data array | Finish data read | Data ECC calculation | | | | |

2-cycle improvement

*FIG. 1A*

| Op Cycle | 0 | 1 | 2 | 3 | 4 | 5 | 6 | 7 | 8 |
|---|---|---|---|---|---|---|---|---|---|
| L2 read - conventional | Set address to tag array | Begin tag read; Tags available at end of cycle | Tag ECC calculation; Update requestor / busy bits | Tag write | Tag compare: Hit calculation; Drive to data array – column address | Data read | Data read | Data ECC calculation | Data write |
| L2 read - proposed | Set address to tag array | Begin tag read; Tags available at end of cycle | Tag ECC calculation; Update requestor / busy bits | Tag write | | | | | |
| | | Set address to data array | Start read access; tag compare; drive to data array | Finish data read | Data ECC Calculation | Data write | Data write | | |

2-cycle improvement

*FIG. 1B*

DATA L2 CACHE WITH SPLIT ACCESS

FIELD OF DISCLOSURE

The technology of the disclosure relates generally memories, and in particular to data L2 cache with split access, e.g., for improved performance.

BACKGROUND

For performance reasons, it is usually desirable to increase memory capacity. In caches, having a larger capacity is desirable in that more cache hits/fewer cache misses can take place. However, a larger cache, such as a larger L2 cache, can also have an undesirable effect of increasing latency. For example, under conventional accesses, increasing an L2 cache from 1 MB to 2 MB can result in an increase in the latency by 2-3 cycles. This can be due to multiple reasons including larger tag access, longer distance for way hit signals, and larger data access in general.

Accordingly, one or more aspects of the present invention may address deficiencies in the conventional implementations.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

An exemplary memory is disclosed. The memory may comprise a data array comprising a plurality of data blocks addressable in rows and columns. The memory may also comprise an access circuit configured to receive as inputs clock (CLK) signals and a read/write operation (RD_WRB) signal. When the RD_WRB signal indicates a read operation, the access circuit may be configured to initiate a data read from the data array during a first cycle based on a row address provided to the memory prior to the first cycle. The first cycle may be a period of a first CLK signal. The access circuit may also be configured to output a read data block at least by an end of a second cycle. The read data block may be a data block of the plurality of data blocks corresponding to the row address and a column address. The second cycle may be a period of a second CLK signal and may be subsequent to the first cycle. The column address may not be available prior to the first cycle.

An exemplary method of accessing a memory comprising a data array is disclosed. The data array may comprise a plurality of data blocks addressable in rows and columns. The method may comprise receiving clock (CLK) signals and a read/write operation (RD_WRB) signal. The method may also comprise performing a memory read when the RW_WRB signal indicates a read operation. The memory read may comprise initiating a data read from the data array during a first cycle based on a row address provided to the memory prior to the first cycle. The first cycle may be a period of a first CLK signal. The memory read may also comprise outputting a read data block at least by an end of a second cycle. The read data block may be a data block of the plurality of data blocks corresponding to the row address and a column address. The second cycle may be a period of a second CLK signal and may be subsequent to the first cycle. The column address may not be available prior to the first cycle.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

BRIEF DESCRIPTION OF THE DRAWINGS

FIG. 1A illustrates a timing comparison between a conventional cache implementation vs a proposed memory array implementation for a read operation.

FIG. 1B illustrates a timing comparison between a conventional cache implementation vs a proposed memory array implementation for a write operation.

Figure 2:
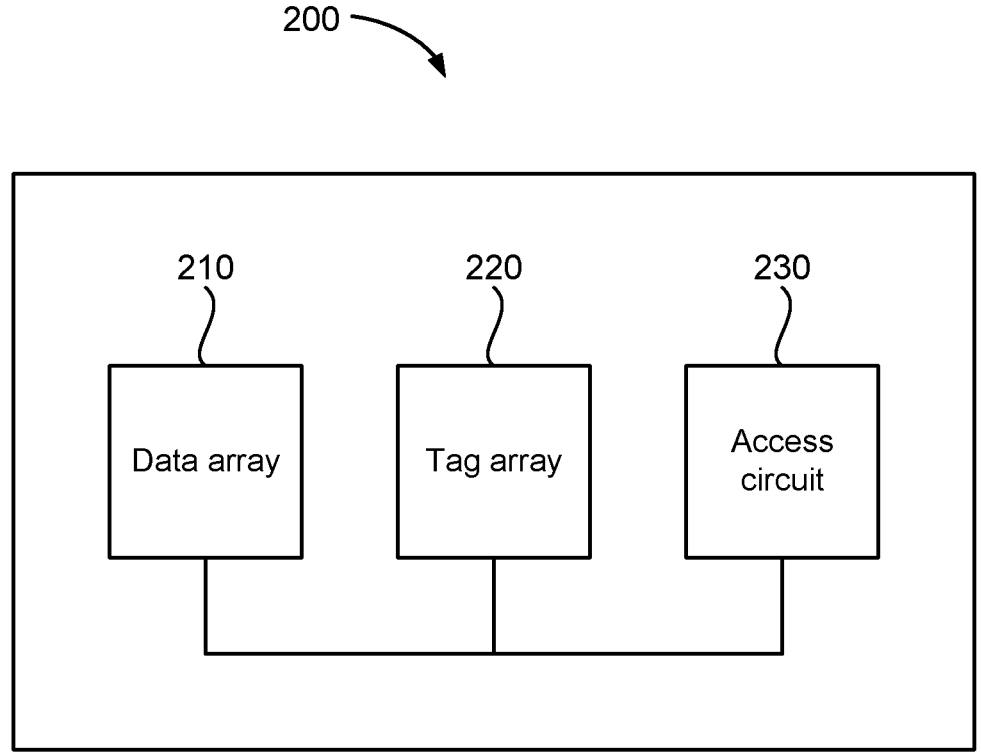
FIG. 2 illustrates a block diagram of a memory according to one or more aspects.

Other objects and advantages associated with the aspects disclosed herein will be apparent to those skilled in the art based on the accompanying drawings and detailed description. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

The word "exemplary" is used herein to mean "serving as an example, instance, or illustration." Any implementation described herein as "exemplary" is not necessarily to be construed as preferred or advantageous over other embodiments. Likewise, the term "implementation" does not require that all implementations include the discussed feature, advantage, or mode of operation.

The terminology used herein describes particular implementations only and should not be construed to limit any implementations disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Various components as described herein may be implemented as application specific integrated circuits (ASICs), programmable gate arrays (e.g., FPGAs), firmware, hardware, software, or a combination thereof. Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to", "instructions that when executed perform", "computer instructions to" and/or other structural components configured to perform the described action.

Those of skill in the art will further appreciate that the various illustrative logical blocks, components, agents, IPs, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, processors, controllers, components, agents, IPs, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is indicated above that conventional implementation of accessing memory, e.g., an L2 cache, can have issues. For example, there can be latency penalties associated with enlarging L2 caches. To address issues associated with conventional memory and access implementations, it is proposed to provide a data instance—e.g., L2 data instance—optimized for cache performance. Conventionally, the data instance (or data array) is the biggest component of the L2 cache. For ease of reference, data array portion of the L2 cache may be referred to DL2.

In a conventional memory array, Read or Write operation cannot start until all inputs—address, controls, data—are available. This is because the conventional memory array does not take advantage of the fact that conventionally the set address is available earlier, but the way address is available later. This is because in conventional cache access, the set address is used to access the tags, then the tags are compared to determine which of the ways (columns) is a hit. That is, the tag comparisons are used to determine the way address. Then the cache may be accessed. Thus, in conventional read or write access, both the set and way addresses must be available before the operation may be performed.

In an aspect, a proposed memory array (e.g., DL2 array) may be configured as sets and ways, in which rows may be viewed as sets and columns may be viewed as ways. That is, Rows=Sets and Columns=Ways. Note that in an aspect, the memory may be physically configured in rows (or sets) and columns (or ways). But in another aspect, the configuration into rows and columns may be logical. That is, the array may be arranged in any physical configuration, but is addressable as sets and ways.

The proposed memory array may allow read access to be broken into two cycles. In the first cycle, the row (set) address may be utilized to access a particular row corresponding to the set address. That is, read of the entire row of DL2 may be initiated in the first cycle. This is because the set address is available early. Then in the second cycle, column selection may be performed, e.g., the way address may be determined. For example, in an N-way set, an N-to-1 multiplexor (mux) (e.g., 8-to-1 mux) may be employed to retrieve the column of data corresponding to the selected way address from the retrieved row of data. In this way, there can be at least one cycle latency improvement relative to conventional reads. This is because in the proposed data array, the data access for the read can start when the set address is available even though the way address is not yet available.

Note that the two cycles for the read access may be logical cycles. That is, a logical cycle may be viewed as a clock cycle whose length or duration is sufficiently long to accomplish a given operation. In an aspect, when implemented, the physical cycles for the read operation may match the logical cycles. That is, it may take two physical cycles to complete the read access—the first cycle to retrieve the row of data and the second cycle to multiplex the particular column of data.

But in another aspect, the physical cycle may be shorter than the logical cycle. For example, a physical clock cycle may be shorter than a logical cycle. That is, each logical cycle may comprise multiple physical cycles. In such instances, when a cycle for read is started, 'No-op' instructions may be provided for one or more subsequent physical cycles until sufficient time has elapsed for the logical cycle read operation to complete.

The proposed memory array may also allow for building a larger instance size, e.g., 4K×288 (512 sets/8 ways/32 Bytes) vs. a conventional array that may be restricted to a smaller size e.g., 4K×72, to meet performance requirements. In addition, non-critical set address may be separated from the critical way address. In this aspect, the set address may be deemed non-critical in that it may be available early. On the other hand, the way address may be deemed critical in that it should be made available as soon as possible. Otherwise, latency in determining the way address may affect performance. The proposed implementation of memory (e.g., DL2) array can have the following technical benefits (not necessarily exhaustive):

Improved setup for way address. This can remove the need for external encode/internal decode and external miss detection.

Larger instance size and reduced number of instances per bank (e.g., from 8 to 2) which may improve timing due at least in part to reduced fanout for critical input signals.

Implementing row redundancy without impacting performance. Typical implementation of row redundancy involves dynamically comparing the address of the row that needs to be accessed with the predetermined address of the row that needs to be replaced/repaired. This comparison can add delay to the critical path and impact overall performance. But in the proposed implementation, since ROWS=SETS and COLUMNS=WAYS and the set address is not critical and available early, adding row redundancy does not impact the critical path.

Further, the conventional implementation requires both set and way addresses to be determined before data access is started. To determine the way address, the tags of the retrieved row (corresponding to the set address) are compared to determine whether there is a cache hit (one of the tags match) or a cache miss (none of the tags match). If there is a hit, the location of the matching tag is encoded and the encoded location is provided as the way address. Thus, in the conventional array implementation of an N-way associative cache, log-N bits encode the way address. For example, for an 8-way associative cache, 3 bits are needed to encode the way address. The encoded way address, along with the set address (which is already encoded) are provided to the memory (e.g., DL2) for retrieval of the data. Within the memory, the encoded way address is decoded to select the correct data column. In an aspect, each data column may be a cache line or a cache block.

But in an aspect of the proposed implementation, there is no need to encode the way address. In an N-way associative cache, an N-bit word—in which each bit corresponds to one of the tags—may be directly provided for the way address. For ease of reference, such N-bit word may be referred to as a "hit/miss" word. A bit of the hit/miss word may be set (one of logical '1' or '0') if the corresponding tag matches (i.e., if the tag is a hit) and may be unset (other of logical '1' or '0') if the corresponding tag does not match (i.e., if the tag is a miss). For ease of description, when set/reset is concerned, it may be assumed that '1' represents a set value and '0' represents a reset value, unless specified otherwise.

Thus, in the proposed implementation, the same set (row) address may be provided to both the tag and data arrays. The tags of the set may be retrieved and compared. Based on the comparison, a hit/miss bit may be generated for each retrieved tag. The hit/miss result for each tag may be provided and be used as is in the data array. This avoids the encoding and decoding of the hit tag location, which can speed up access. Note that with the hit/miss word, either only one bit will be set (indicating a cache hit) or all of the bits will be unset (indicating a cache miss).

FIG. 1A illustrates a timing comparison between a conventional cache implementation vs the proposed memory (e.g., L2 cache) array implementation for a read access. In this instance, it is assumed that L2 cache is accessed. It is also assumed that the L2 cache may be divided into a tag array and a data array (e.g., DL2). Note that it is not required that the arrays are divided physically although that is a possible implementation. It is sufficient that the tags and corresponding data are addressable or otherwise accessible logically.

For conventional L2 read accesses, the upper half is associated with the tag access and the lower half is associated with data access. In the conventional implementation, the read may be performed as follows.

In cycle 0, set address is provided to the tag array.

In cycle 1, for the tag array, the tags are read from the row associated with the set address. At the end of the cycle 1, the retrieved tags are available.

In cycle 2, for the tag array, the tag error correction code (ECC) is calculated—e.g., for verification. Also, requestor and/or busy bits are updated. For the data array, the tags of the row (set) are compared to determine whether there is a hit. If so (i.e., one of the tags matches), the matching tag's column is calculated and encoded as the way address. This portion of the data array operation conventionally takes two cycles.

In cycle 3, for the tag array, tags are written, e.g., to update status bits. For the data array, the tag comparison and driving of column address continues. At the end, both the set and way addresses to drive the data array are available.

In cycles 4 and 5, assuming there is a hit, the data block (e.g., cache line) corresponding to set and way addresses is read. In the conventional read, way address is decoded, and the data block of the set corresponding to the way address is retrieved. The data block read is assumed to take two cycles.

In cycle 6, ECC for the read data is calculated.

However, with the proposed implementation, the read may be performed as follows:

In cycle 0, set address may be provided to the tag array.

In cycle 1, for the tag array, the tags may be read from the row associated with the set address. At the end of cycle 1, the retrieved tags can be available. In addition, the set address may also be provided to the data array.

In cycle 2, for the tag array, the tag ECC may be calculated—e.g., for verification. Also, requestor and/or busy bits may be updated. For the data array, reading of data from the data array may be initiated. Recall that each row may include N data blocks (e.g., N cache lines/blocks) for an N-way associated cache. Thus, in an aspect, reading of N data blocks associated with the set address may be initiated in cycle 2. In addition, the tags of the N data blocks may be compared to determine whether there is a hit. If so, the data array may be driven with the column (way) address to select one of the N data blocks. In an aspect, the location of the matching tag need not be encoded. Rather, only the bit of the hit/miss word associated with the matching tag may be set. In the data array, the hit/miss word—i.e., the unencoded way address—may be used directly to multiplex the data block of the correct column to be read out.

In cycle 3, for the tag array, tags may be written, e.g., to update status. For the data array, the data read operation may complete. Note that even though the read operation may take multiple (e.g., two) cycles, the read may finish in cycle 3 since the read can be started in cycle 2. In an aspect, the multiplexing of the correct column data block may be performed in cycle 3.

In cycle 4, ECC for the retrieved data may be calculated.

Operations regarding the tag array may be same for both conventional and the proposed read access. However, there can be at least two cycle improvement in accessing data blocks for read in the proposed data array implementation. This is due to at least the following factors. First, in the conventional read access, accessing the data block in the data array does NOT begin until cycle 4. This is because both the set and way addresses—which are both encoded—are necessary, and the way address is not available until end of cycle 3. As seen, the reading of the N tags of the row associated with the set address completes after cycle 1. Then in cycles 2 and 3, the retrieved tags are compared to determine if there is a hit, which is assumed to take two cycles. Then if there is a hit, the column number n (n=0 . . . N−1) of the matching tag is encoded and provided as the way address. Then the reading of the data block may be initiated in cycle 4 and finish in cycle 5.

But in contrast, with the proposed implementation, the set address may be provided to the data array early, e.g., in cycle 1. This allows an early initiation of retrieval of data, i.e., in cycle 2 even though the way address is not yet available. For example, the retrieval of row data blocks corresponding to the set address may be initiated. Here, "row data blocks" is used to refer to N data blocks of a row. In cycle 2, the tags (read in cycle 1) may be compared with the tags of the row data blocks to determine if there is a hit. If so, then a bit associated with the matching tag may be set (e.g., in the hit/miss word) and provided to the data array. That is, the N bit hit/miss word—which may also be viewed as a fully decoded way address—may be provided directly. In cycle 3, the hit/miss word may be used to multiplex the correct column data block n (n=0 . . . N−1) of the row data blocks.

FIG. 1B illustrates a comparison between a conventional cache implementation for write vs the proposed array implementation for write. Again, it is assumed that L2 cache is accessed. The data to be written is also assumed to be provided before the write access is started. Just as before, the upper half is associated with the tag access and the lower half is associated with data access. Here, only the operations that are different from the read access will be described.

In the conventional implementation, the write access differs from the read access in cycles 6-8:

In cycle 6, for the data array, ECC for data is calculated.

In the cycles 7 and 8, for the data array, the provided data block may be written to the selected data block. The data write is assumed to take two cycles.

However, with the proposed implementation, the write access differs from the read access in cycles 4-6:

In cycle 4, for the data array, ECC for data is calculated.

In the cycles 5 and 6, for the data array, the provided data block may be written to the selected data block. The data write is assumed to take two cycles.

Again, there can be as much as two cycle improvement in accessing the data array for writes with the proposed implementation relative to the conventional implementation. And again, this can be due to earlier start of reads (e.g., as soon as the set address is available) and faster way address selection (e.g., hit/miss bits instead of encoded way address).

For a more complete context, calculating the ECC (in cycle 6 in the conventional write implementation and in cycle 4 of the proposed write implementation) is explained as follows. Writing to the cache may involve updating one or more bytes in the cache line. Typically, ECC is calculated at multiple byte level (e.g., ECC for every 16 bytes). In such an instance, if fewer than 16 bytes are written, then the 16 bytes are read initially, the write data is then merged with the read data, followed by recalculating the ECC, and finally writing to the data array. In the context of FIG. 1B for conventional writes, cycles 0-5 are used to read the existing data from the cache. Merging of write data and read data and ECC calculation is performed in cycle 6. Thereafter, the write takes place in cycles 7-8. But in the proposed writes, cycles 0-3 are used to read the existing data from the cache (showing two cycle improvement), ECC calculation is performed in cycle 4, and write taking place in cycles 5-6.

FIG. 2 illustrates a block diagram of a memory 200 according to one or more aspects. The memory 200 may comprise a data array 210, a tag array 220 and an access circuit 230. The tag array 220 may be configured to store tags associated with data blocks stored in the data array 210. The access circuit 230 may be a circuit configured to provide the necessary signals (clocks, controls, etc.) to access the tag and data arrays 210, 220. In FIG. 2, the tag and data arrays 210, 220 are shown as being separate. This is done for convenience. As mentioned above, the actual physical implementation may take a variety of forms.

Figure 3:
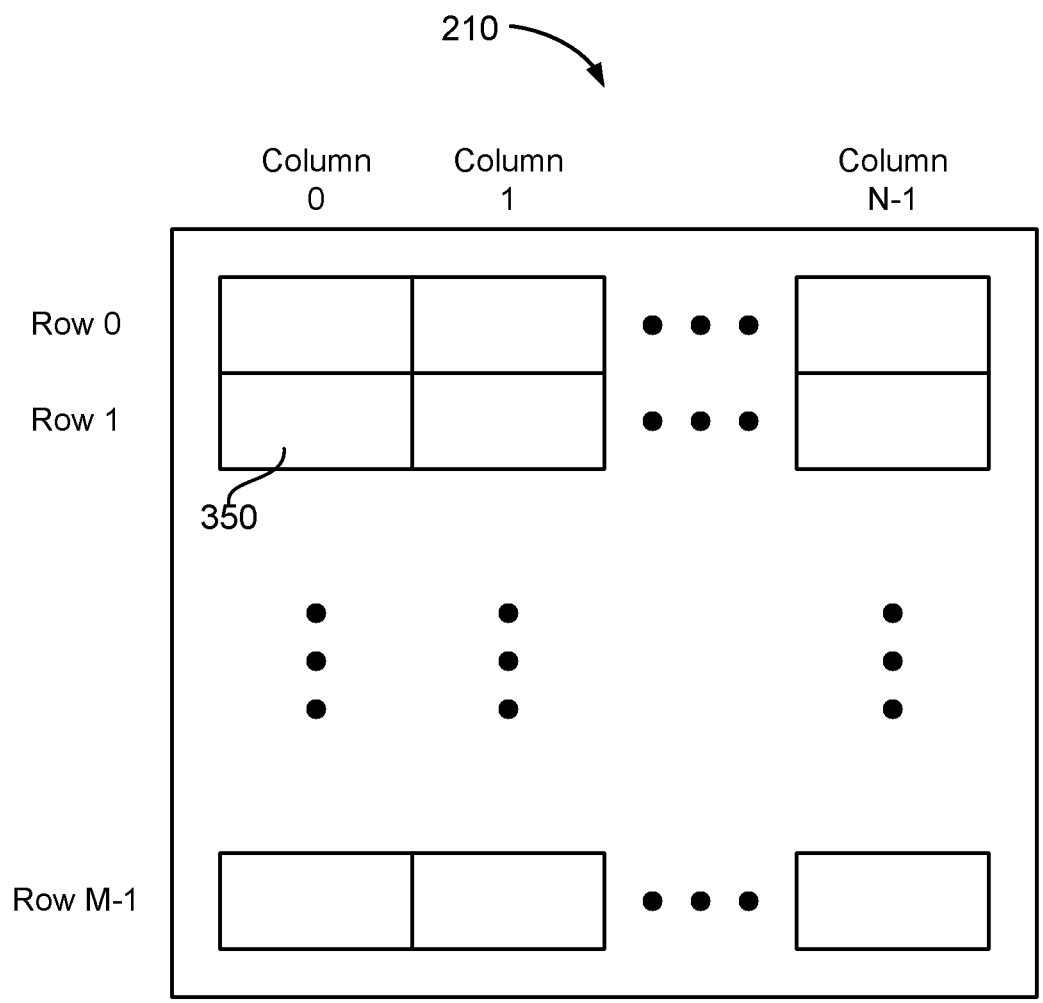
FIG. 3 illustrates an arrangement of a data array according to one or more aspects.

FIG. 3 illustrates an organization of a data array 210 of a memory (e.g., memory 200) according to one or more aspects. The data array 210 may include a plurality of data blocks 350. Each data block 350 may be addressable as a combination of row and column (alternatively set and column) addresses. When the data array 210 is used in a cache, each data block may be a cache line or block. There may be M rows and N columns. Thus, the number of data blocks may be M×N, and a specific data block may correspond to a row m (m=0, 1 . . . M−1) and a column n (n=0, 1 . . . N−1).

With N columns, the data array 210 may be an example of an N-way associative memory. Note that the data array 210 can be, but need not be, physically implemented as rows and columns. It is sufficient that the data backs are logically addressable with row (or set) and column (or way) addresses.

Figure 4:
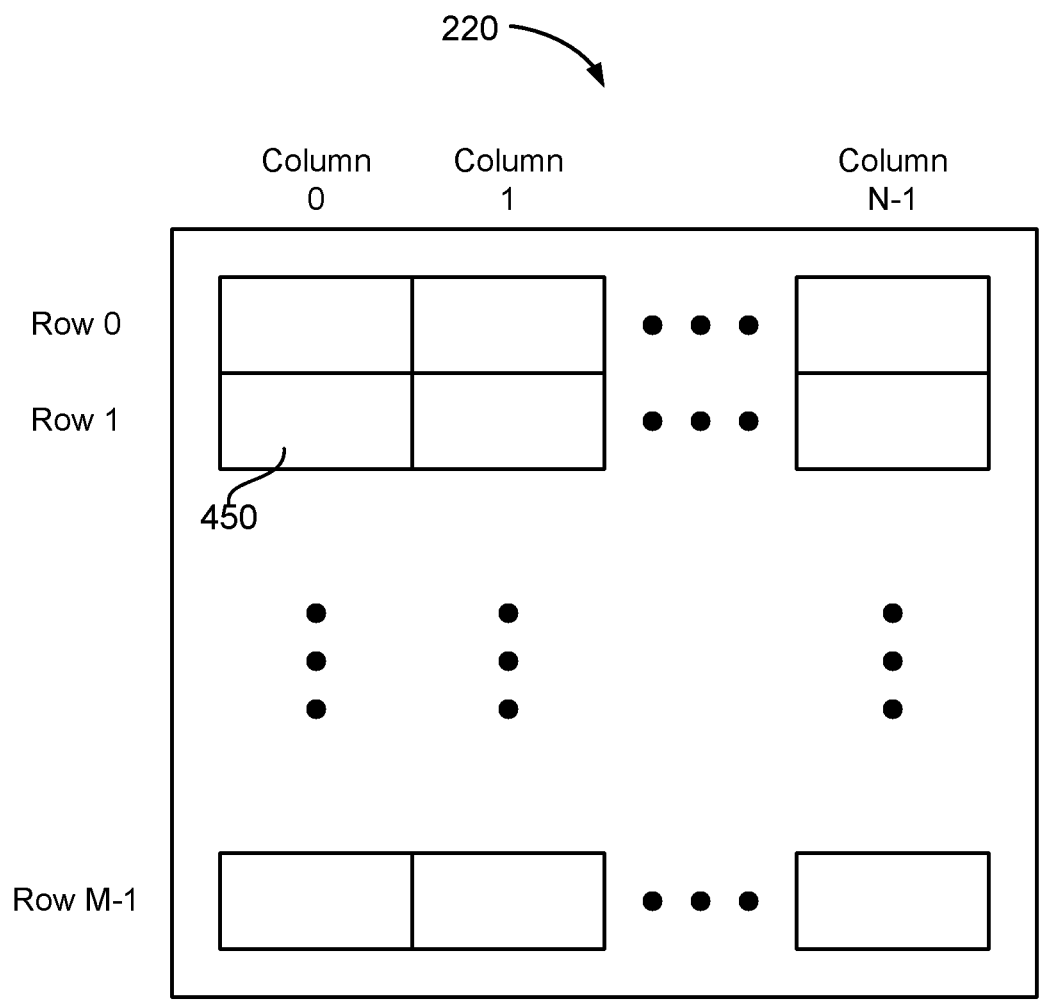
FIG. 4 illustrates an arrangement of a tag array according to one or more aspects.

FIG. 4 illustrates an organization of a tag array 220 of a memory (e.g., memory 200) according to one or more aspects. The organization of the tag array 220 may be very similar to the organization of the data array 210 except that the tag array 220 may comprise a plurality of tags 450. Each tag 450 may be addressable as a combination of row and column addresses similar to addressing each data block 350. In an aspect, each tag 450 of address m,n (m=0 . . . M−1, n=0 . . . N−1) may correspond to the tag 350 of the same address m,n.

Figure 5:
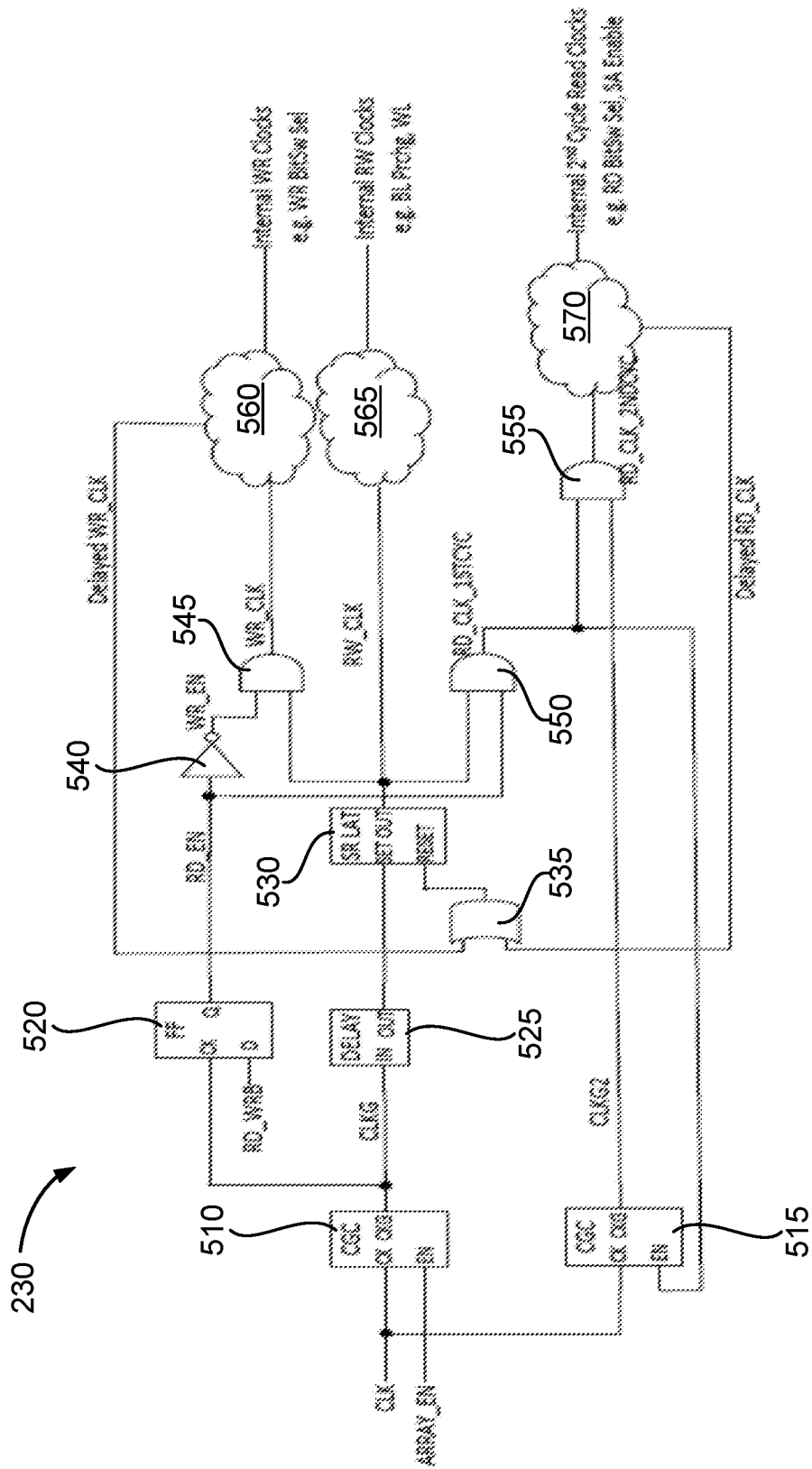
FIG. 5 illustrates an access circuit according to one or more aspects.

FIG. 5 illustrates an access circuit 230 for performing read and write access of memory according to an aspect. The access circuit 230 may be employed in a memory (e.g., memory 200). The access circuit 230 may comprise a first clock gating cell (CGC) 510, a second CGC 515, a flip flop (FF) 520, a delay 525, a set/reset (SR) latch 530, a reset logic 535, a write enable (WR_EN) logic 540, a write clock (WR_CLK) logic 545, a read clock first cycle (RD_CLK_1STCYC) logic 550, a read clock second cycle (RD_CLK_2NDCYC) logic 555, an internal write (WR) clock generator 560, an internal read/write (RW) clock generator 565, and an internal second cycle read (RD) clock generator 570. As will be explained, with the access circuit 230, a read may take two cycles while a write may take one cycle. In an aspect, these cycles may be logical. In another aspect, the cycles may be physical.

It should be noted that the access circuit 230 is a logical representation. It is contemplated that the actual physical implementation can take many forms. It should also be noted that in FIG. 5, the circuits for actually accessing the data array to read and write are not shown for sake of simplicity. Rather, one purpose of FIG. 5 is to explain the timings of signals related to read and write accesses to memory. Note that there are three external inputs to the access circuit 230—a clock (CLK) signal (provided to the CK input of the first CGC 510), an array enable (ARRAY_EN) signal (provided to EN input of the first CGC 510), and read/write operation (RD_WRB) signal (provided to the D input of the FF 520). If the array is enabled (e.g., by the ARRAY_EN signal), then the access circuit 230 may provide appropriate clocks—e.g., by following the CLK signal—to perform the read operation (e.g., when RD_WRB='1') or the write operation (e.g., when RD_WRB='0').

Note that in FIG. 5, the reset logic 535 is implemented as an OR logic, the WR_EN logic 540 is implemented as a NOT logic, the WR_CLK logic 545 is implemented as a first AND logic, the RD_CLK_1STCYC logic 550 is implemented as a second AND logic, and the RD_CLK_2NDCYC logic 555 is implemented as a third AND logic. This is simply because it is assumed that the read and write operations are specified by a single read/write signal, namely when the RD_WRB is '1' and '0', respectively. For example, if the write operation is specified, the RD_EN signal is '0'. By using the NOT logic as the WR_EN logic 545, a WR_EN signal of '1' may be provided to the WR_CLK logic 545 to generate the proper WR_CLK signal. In short, specific circuit implementations of any one or more of the logics 535, 540, 545, 550, 555 may depend on how the RD_WRB signal is defined (e.g., as a single signal, as two different signals, etc.), and thus those having skill in the art will understand that the described aspect is to be considered for purposes of illustration but not limitation.

Figure 6A:
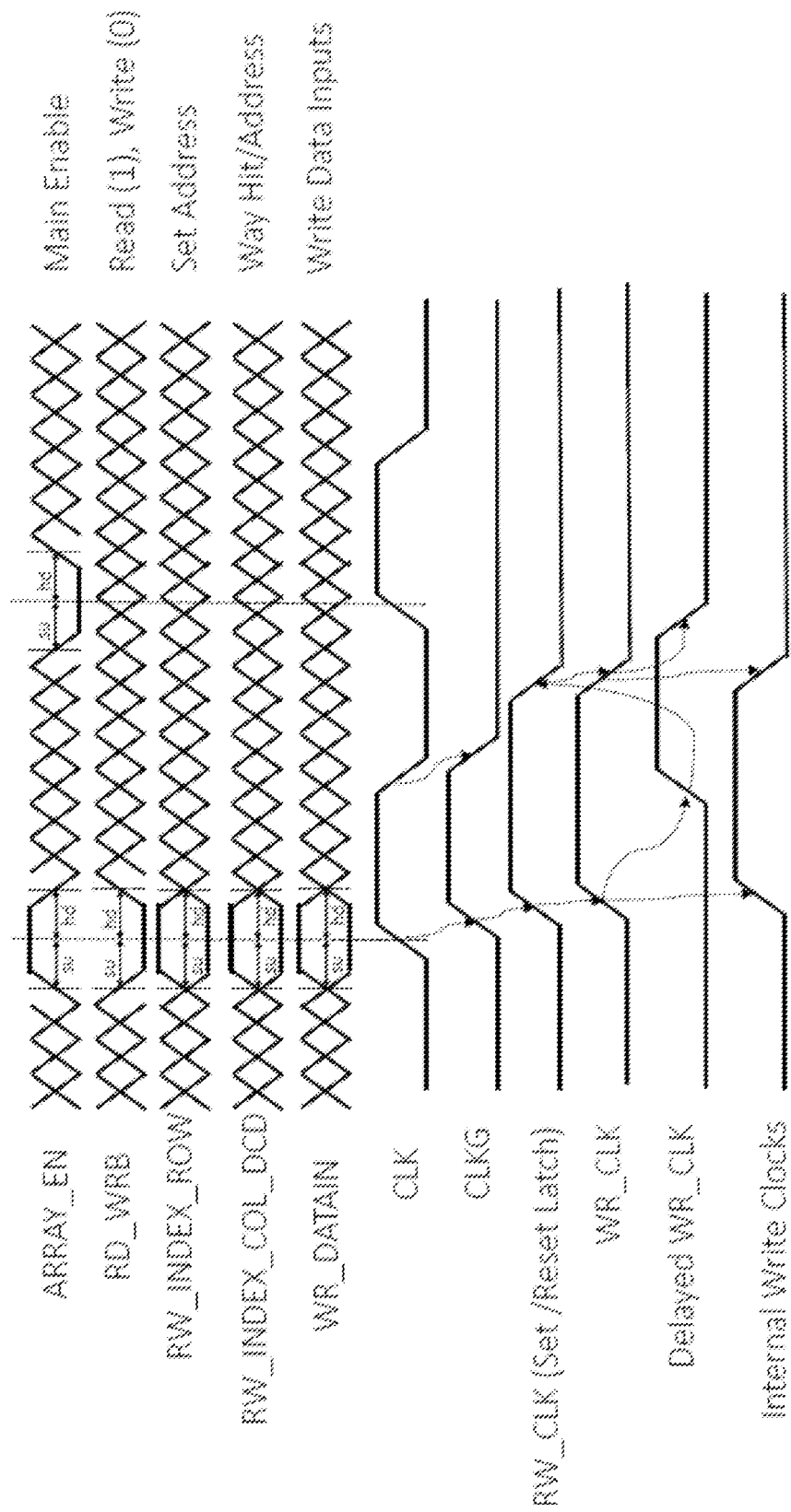
FIG. 6A illustrates an example timing of signals among components of an access circuit for a write according to one or more aspects.

When the write operation is selected (RD_WRB='0') and the array is enabled (ARRAY_EN='1'), the write operation may finish in one cycle (e.g., one cycle of the CLK signal). FIG. 6A illustrates the timing of the write operation. For the write operation, the write data as well as the full address is assumed to be available when the operation starts.

At the first CGC 510, when the CLK signal transitions to '1', the gated clock (CLKG) signal (output of the first CGC 510) may also transition to '1'. That is, the CLKG signal may follow the CLK signal. The CLKG signal and may be provided to the CK input of the FF 520 and to the input of the delay 525.

At the FF 520, when the CLKG signal transitions to '1', the read enable (RD_EN) signal (output of the FF 220) can be '0' (or unset) since the RD_WRB='0'. The RD_EN signal may be provided to the WR_EN logic 540 and to the RD_CLK_1STCYC logic 550. The FF 520 may be used to capture the input address, input controls, etc. Note that there may be multiple FF 520 to capture the input address and control signals. But for simplicity sake, a single FF 520 is shown as a representation.

At the delay 525, when the CLKG signal transitions to '1', the output of the delay 525 may also transition to '1' after some delay. That is, the output may be a delayed version of the CLKG signal. The delayed CLKG signal may be provided to the set input of the SR latch 530.

At the SR latch 530, when set input (e.g., delayed CLKG signal) transitions to '1', the output of the SR latch may be set, i.e., may be set to '1'. This output, which may be referred to as the read/write clock (RW_CLK) signal, may be provided to the WR_CLK logic 545 (e.g., first AND logic), to the internal RW clock generator 565 and to the RD_CLK_1STCYC logic 550.

At the WR_EN logic 540, since the RD_EN signal (from the FF 520) is '0' (or not set), the output thereof is '1' (or set). This output may be provided to the WR_CLK logic 545 as a write enable (WR_EN) signal.

At the WR_CLK logic 545, since both inputs (WR_EN signal from the WR_EN logic 540 and RW_CLK signal from the SR latch 530) are '1', the output thereof is also '1'. This output may be provided to the internal WR clock generator 560 as write clock (WR_CLK) signal.

At the internal WR clock generator 560, internal write-specific clocks for the write operation (e.g., write bit selects) may be generated when the WR_CLK signal is set (e.g., transitions to '1'). The internal WR clock generator 560 may also be configured to generate a delayed write clock (delayed WR_CLK), which may be provided to the reset logic 535. The delayed WR_CLK may be provided after a duration of time sufficient to allow the write operation to be completed.

At the internal RW clock generator 565, internal clocks common to both reads and writes (e.g., bit line precharge, word line precharge, etc.) may be generated when the RW_CLK signal (from the SR latch 530) transitions to '1'.

At the reset logic 535, when the delayed WR_CLK transitions to '1', the output may also transition to '1', which may be provided to the reset input of the SR latch 530.

At the SR latch 530, when reset input transitions to '1', the output of the SR latch may reset, i.e., the RW_CLK signal may transition to '0'. As a result, the internal RW clock generator 565 may be disabled. Also as a result, output of the WR_CLK logic 545 may transition to '0' leading to the internal WR clock generator 560 being disabled.

Figure 6B:
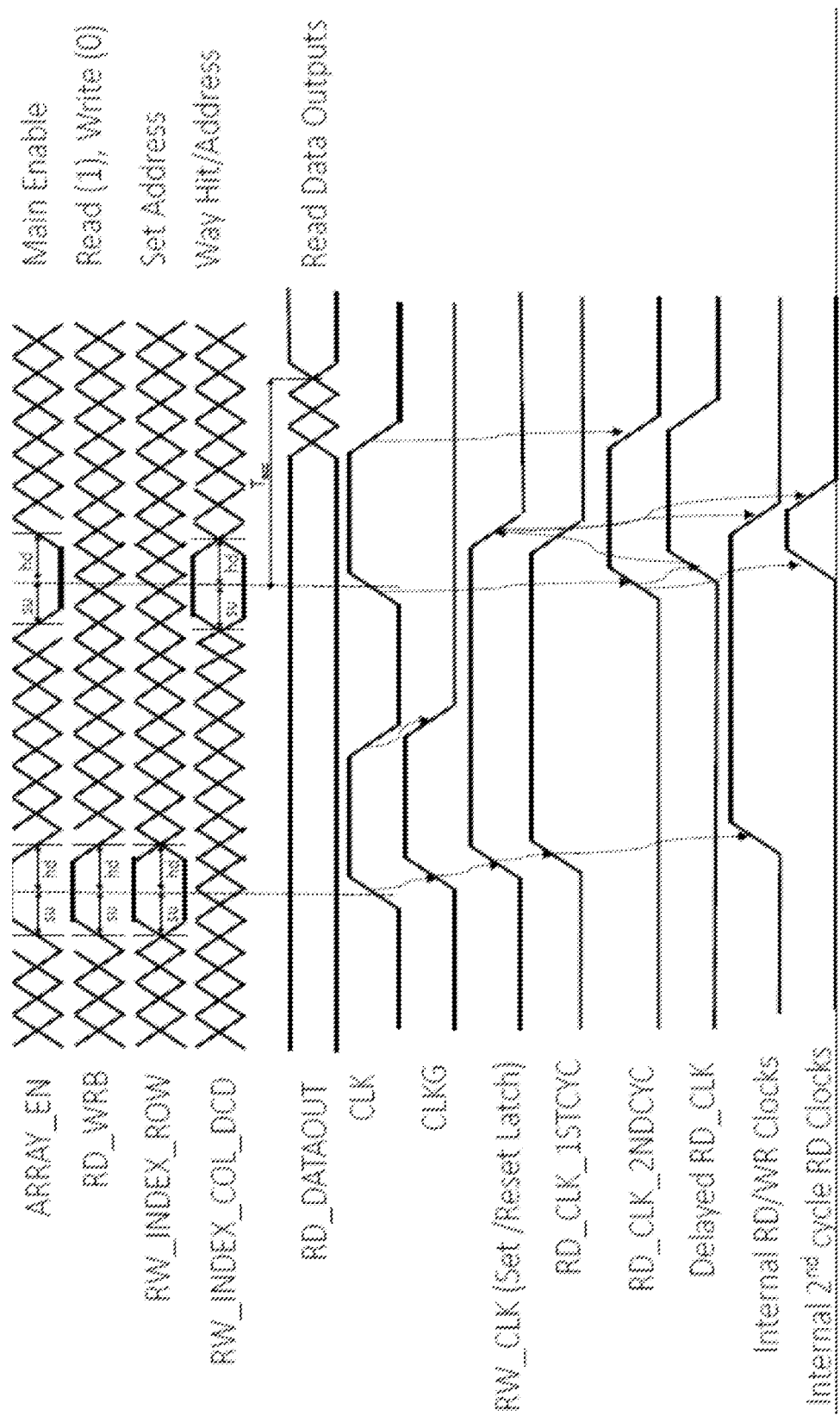
FIG. 6B illustrates an example timing of signals among components of an access circuit for a read according to one or more aspects.

When read operation is selected (RD_WRB='1') and the array is enabled (ARRAY_EN='1'), the read operation may finish in two cycles (two cycles of the CLK signal). FIG. 6B illustrates the timing of the read operation.

At the first CGC 510, when the first CLK signal transitions to '1' (first cycle), first CLKG signal (output of the first CGC 510) may also transitions to '1' and may be provided to the CK input of the FF 520 and to the input of the delay 525.

At the FF 520, when the first CLKG signal transitions to '1', the RD_EN signal (output of the FF 220) can be '1' since the RD_WRB='1'. The RD_EN signal may be provided to the WR_EN logic 540 and to the RD_CLK_1STCYC logic 550.

At the delay 525, when the first CLKG signal transitions to '1', the output of the delay 525 may also transitions to '1' after some delay. That is, the output may be a delayed version of the first CLKG signal. The delayed first CLKG signal may be provided to the set input of the SR latch 530.

At the SR latch 530, when the set input (e.g., delayed first CLKG signal) transitions to '1', the output of the SR latch may set, i.e., may be set to '1'. This output, which may be referred to as the read/write clock (RW_CLK) signal, may be provided to the first AND logic 545, to the internal RW clock generator 565 and to the RD_CLK_1STCYC logic 550.

At the WR_EN logic 540, since the RD_EN signal (from the FF 520) is '1', the output thereof is '0'. This output may be provided to the WR_CLK logic 545, e.g., as the WR_EN signal (which is not set meaning that the write is NOT enabled).

At the WR_CLK logic 545, since one of the inputs—the WR_EN signal from the WR_EN logic 540—is '0', the output is '0', which may disable the internal WR clock generator 560 from generating write-specific internal clocks, and may also prevent the generation of the delayed WR_CLK.

At the internal RW clock generator 565, internal clocks common to both reads and writes (e.g., bit line precharge, word line, etc.) may be generated when the RW_CLK (from the SR latch 530) signal transitions to '1'.

At the RD_CLK_1STCYC logic 550, since both inputs (RD_EN signal from the FF 520 and the RW_CLK from the SR latch 530) are '1', the output thereof—referred to as the RD_CLK_1STCYC signal—is also '1'. At this point, the row data from the row of the data array corresponding to the set address (e.g., N cache lines) may be read. The RD_CLK_1STCYC signal may be provided to the RD_CLK_2NDCYC logic 555 and to the EN input of the second CGC 515.

At the second CGC 515, since the EN input is '1', the second CGC 515 may be enabled. Then at the next transition of the CLK input to '1' (second cycle), the output CLKG2—the second CLKG signal—may also transitions to '1' and provided to the second input of the third AND logic 555.

At the RD_CLK_2NDCYC logic 555, since both inputs are '1', the output thereof also transitions to '1'. This output is provided to the internal second cycle RD clock generator 570 as RD_CLK_2NDCYC.

At the internal second cycle RD clock generator 570, internal second clocks necessary for the read operation (e.g., read bit switch select, column select, sense amplifier (SA) enable, etc.) may be generated when the RD_CLK_2NDCYC signal transitions to '1'. At this point, one of the data blocks retrieved during the first cycle may be multiplexed if there is a hit. The internal second cycle RD clock generator 570 may also be configured to generate a delayed read clock (delayed RD_CLK), which may be provided to the OR logic 535. The delayed RD_CLK may be provided after a duration of time sufficient to allow the read operation, e.g., the multiplexing operation, to be completed.

At the reset logic 535, when the delayed RD_CLK transitions to '1', the output may also transition to '1', which may be provided to the reset input of the SR latch 530.

At the SR latch 530, when reset input transitions to '1', the output of the SR latch 530 may reset, i.e., the RW_CLK signal may transition to '0'. As a result, the internal RW clock generator 565 may be disabled. Also as a result, output of the RD_CLK_1STCYC logic 550 may transition to '0', which may cause the output of the RD_CLK_2NDCYC 550 transitioning to '0', which in turn may lead the disabling of the internal second cycle RD clock generator 570.

Conventionally, when a circuit is powered up, the state of the set/reset latch is unknown and thus a scheme involving control signals is utilized to put the latch into a known state, such as the reset state. However, one very significant technical benefit of the access circuit 230 is that upon power up, the SR latch 530 may be put into the reset state by using the logic involved normal operation without requiring any other control signals.

If the SR latch 530 powers up in the reset state (output powers up as '0'), this is ok and clocking the access circuit 230 with the CLK signal will not change the state. On the other hand, if the SR latch 530 powers up in the set state (e.g., output powers up as '1') and the RD_EN powers up in the reset state (e.g., powers up as '0'), then the WR_CLK logic 545 generates the WR_CLK signal leading to the internal WR clock generator 560 to generate the delayed WR_CLK, which in turn resets the SR latch 530. Finally, if the SR latch 530 powers up in the set state (e.g., output powers up as '1') and the RD_EN also powers up in the set state (e.g., powers up as '1'), then output of the RD_CLK_1STCYC logic 550 will be '1'. At the second CGC 515, since the EN input is '1', the second CGC 515 is enabled. Then at the next transition of the CLK input to '1', independent of the state of other input signals, the output CLKG2 will transition to '1' and provided to the second input of the third AND logic 555. At the RD_CLK_2NDCYC logic 555, since both inputs are '1', the output thereof also transitions to '1'. This output is provided to the internal second cycle RD clock generator 570. The internal second-cycle RD clock generator 570 will generate a delayed read clock (delayed RD_CLK), which in turn resets the SR latch 530. In short, the logic of the access circuit 230 used for normal operation may be used in power up—without further external controls—to guarantee that the SR latch 530 is in the reset state.

Figure 7:
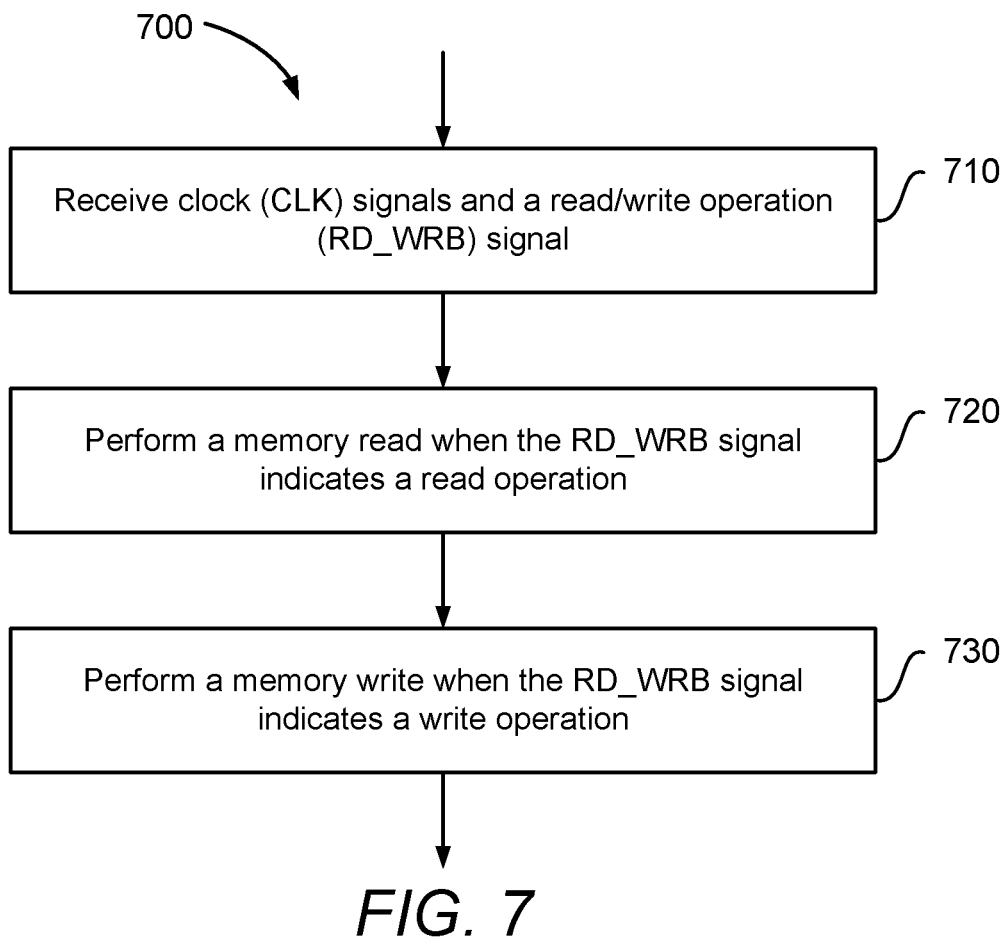
FIGS. 7-13B illustrate a method of accessing a memory according to one or more aspects.

FIG. 7 illustrates a flow chart of a method 700 to access a memory, such as the memory 200. In block 710, the memory (e.g., memory 200) may receive clock (CLK) signals and a read/write operation (RD_WRB).

In block 720, the memory may perform a memory read when the RD_WRB signal indicates a read operation. Recall that the read can take two cycles, e.g., first and second cycles. Thus, in this instance, the CLK signals received by the memory may be first and second CLK signals, in which the second CLK signal is received after the first CLK signal. The first cycle may be defined as a period or a duration of the first CLK signal, and the second cycle may be defined as a period or a duration of the second CLK signal. In an aspect, the second cycle may be assumed to be subsequent to the first cycle. In another aspect, the first and second cycles may be successive.

Figure 8:
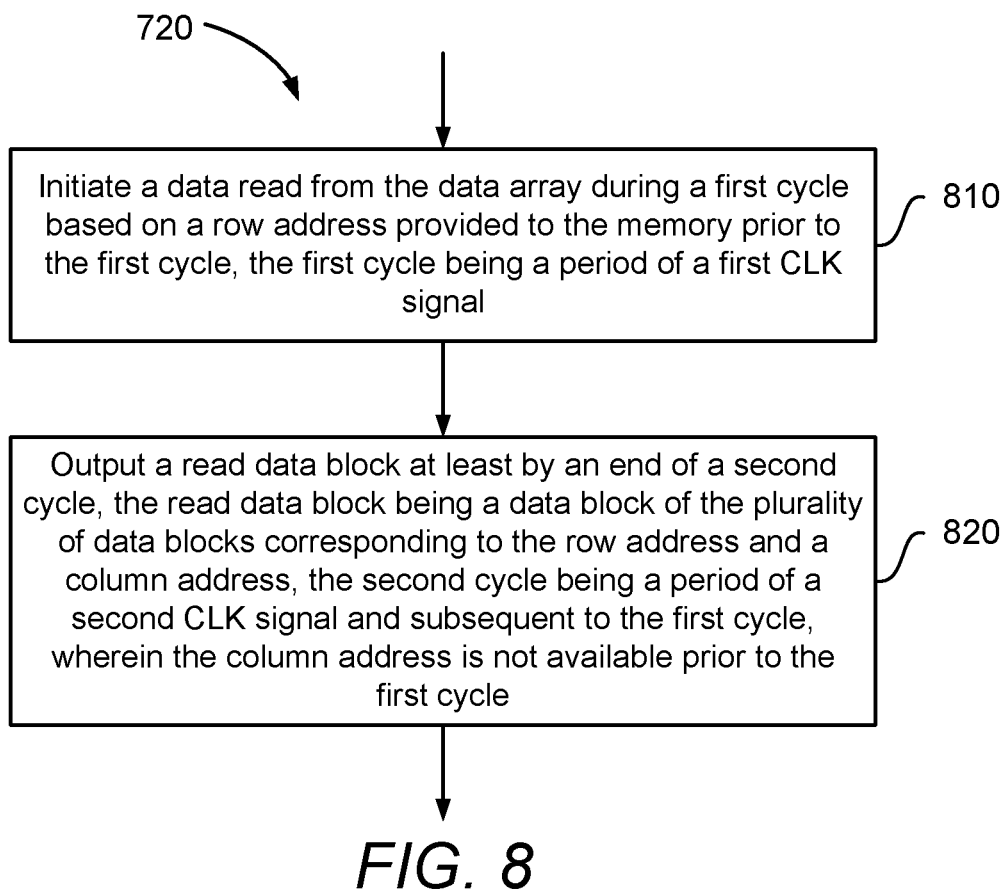

FIG. 8 illustrates a flow chart of an example process for implementing block 720. In block 810, the memory (e.g., the access circuit 230) may initiate a data read from the data array 210 during the first cycle based on a row address provided to the memory 200 prior to the first cycle.

Recall that the data array 210 may be N-way associative. That is, there may be M×N data blocks (e.g., cache lines, cache blocks) in which M may represent a number of row (or set) addresses and N may represent a number of column (or way) addresses. As such, m may represent a row address, m=0 . . . M−1, and n may represent a column address, n=0 . . . N−1. Then in an aspect, initiating the data read may comprise reading the N data blocks corresponding to the row address m during the first cycle. It should be noted that the way (column) address has not been determined. This means that the data read may be started even when the way address is not yet available prior to the first cycle.

In block 820, the memory may output a read data block at least by an end of the second cycle. The read data block may be a data block 350 of the plurality of data blocks 350 in the data array 210 corresponding to the row address and the column address.

Figure 9:
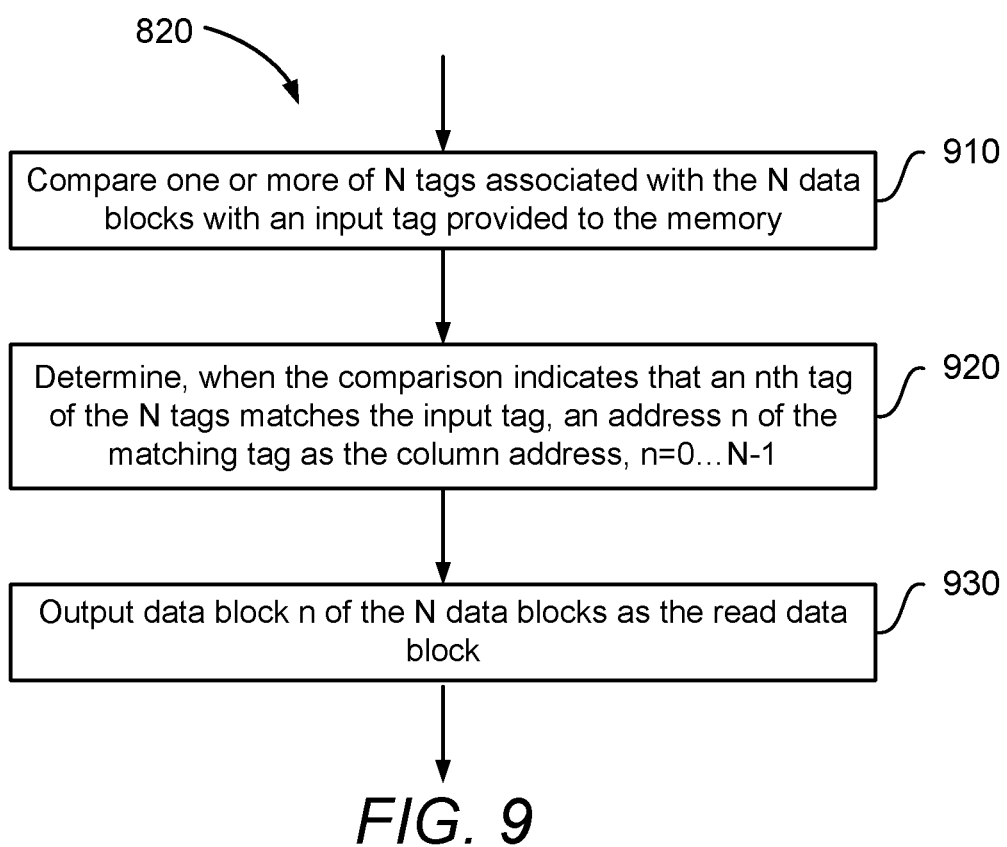

FIG. 9 illustrates a flow chart of an example process for implementing block 820. In block 910, the memory (e.g., the access circuit 230) may compare one or more of N tags, which may be stored in the tag array 220, associated with the N data blocks with an input tag provided to the memory 200. In an aspect, it may not be necessary to inspect all N tags. An expectation is that there can be only one matching tag (in case of a hit) or there will be no matching tags (in case of a miss). Thus, if a matching tag is found among the N tags, then there is no need to inspect others of the N tags. In an aspect, block 910 may be performed during the first cycle.

If the comparison indicates that an nth tag of the N tags does match the input tag, then in block 920, the memory may determine an address n of the matching tag as the column address. In an aspect, block 920 may be performed during the first cycle.

In block 930, the memory may output data block n of the N data blocks as the read data block. The read data block—i.e., the data block corresponding to the matching tag—may be read out during the second cycle. For example, the data block n may be multiplexed from the N data blocks. In an aspect, block 920 may be performed during the second cycle.

Figure 10:
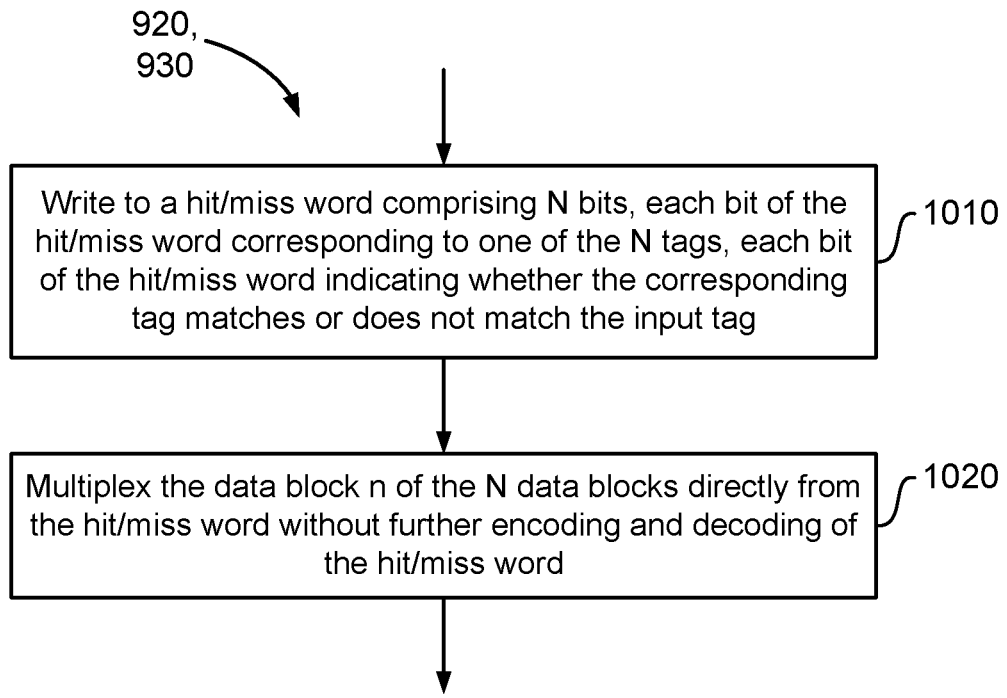

FIG. 10 illustrates a flow chart of an example process for implementing blocks 920 and 930. In block 1010, the memory may write to a hit/miss word comprising N bits. Each bit of the hit/miss word may correspond to one of the N tags. Each bit of the hit/miss word may indicate whether the corresponding tag matches or does not match the input tag.

In block 1020, the memory may multiplex the data block n of the N data blocks directly from the hit/miss word without further encoding and decoding of the hit/miss word.

Figure 11A:
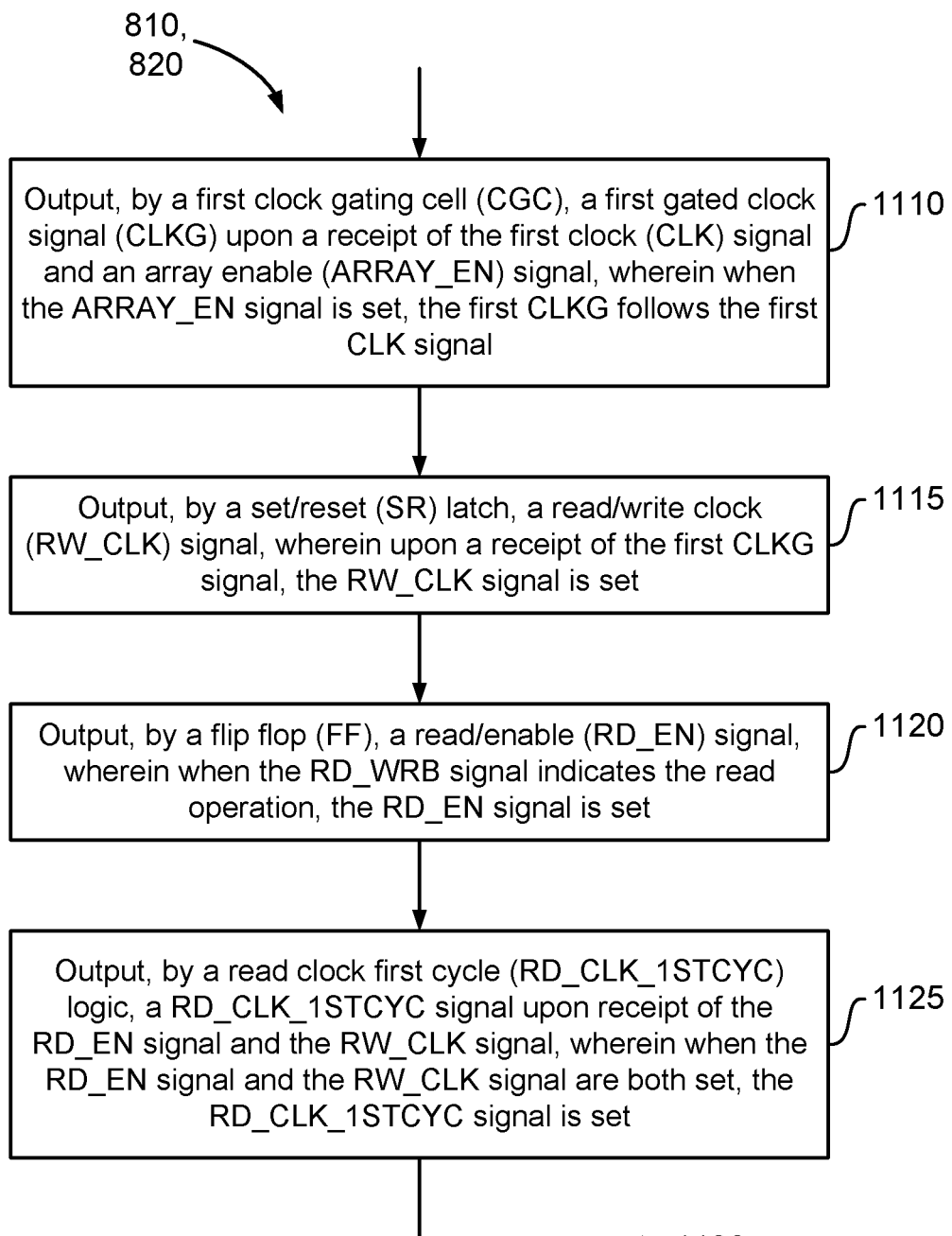
Figure 11B:
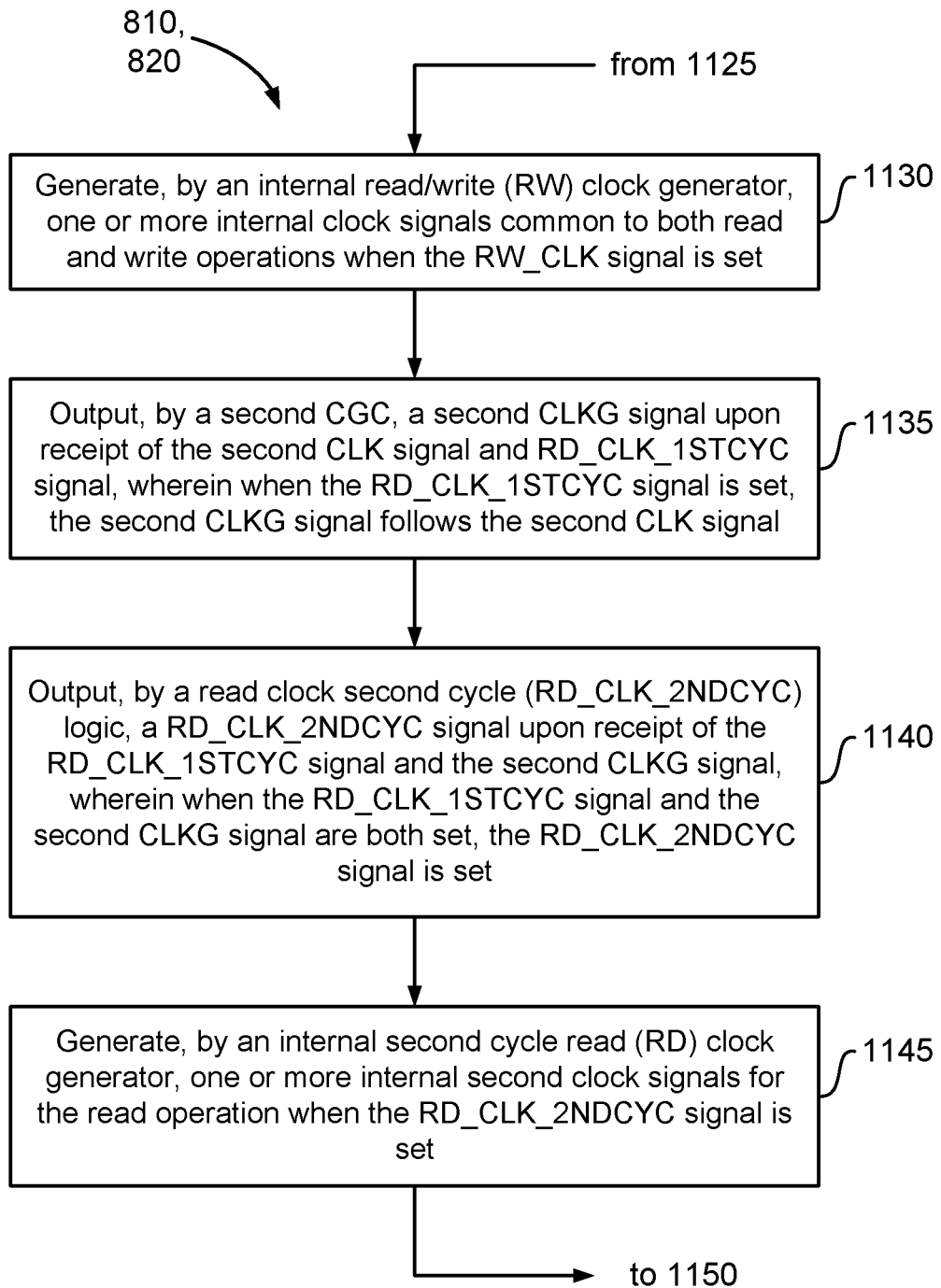
Figure 11C:
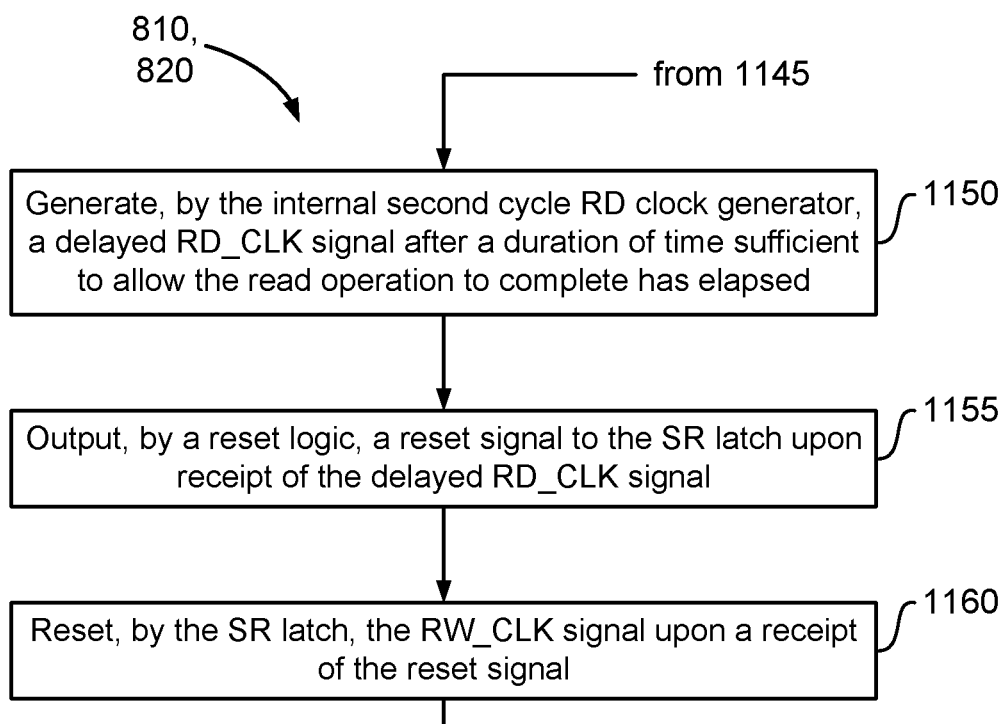

FIGS. 11A, 11B and 11C illustrate a flow chart of another example process for implementing blocks 810 and 820. The illustrated flow chart may be viewed as representing acts performed by the components of the access circuit 230. Note that the WR_EN logic 540, the WR_CLK logic 545, and the internal WR clock generator 560 need not be involved in read access.

In block 1110, the first CGC 510 may output a first CLKG signal upon a receipt of the first CLK signal and an array enable (ARRAY_EN) signal. When the ARRAY_EN signal is set, the first CLKG signal may follow the first CLK signal.

In block 1115, the SR latch 530 may output a RW_CLK signal. When the SR latch 530 receives the first CLKG signal, the RW_CLK signal may be set.

In block 1120, the FF 520 may output a RD_EN. When the RD_WRB signal indicates the read operation, the RD_EN signal may be set.

In block 1125, the RD_CLK_1STCYC logic 550 may output a RD_CLK_1STCYC signal upon receipt of the RD_EN signal and the RW_CLK signal. When the RD_EN signal and the RW_CLK signal are both set, the RD_CLK_1STCYC signal may be set.

In block 1130, the internal RW clock generator 565 may generate one or more internal clock signals common to both read and write operations when the RW_CLK signal is set.

In block 1135, the second CGC 515 may output a second CLKG signal upon receipt of the second CLK signal and RD_CLK_1STCYC signal. When the RD_CLK_1STCYC signal is set, the second CLKG signal may follow the second CLK signal.

In block 1140, the RD_CLK_2NDCYC logic 555 may output a RD_CLK_2NDCYC signal upon receipt of the RD_CLK_1STCYC signal and the second CLKG signal. When the RD_CLK_1STCYC signal and the second CLKG signal are both set, the RD_CLK_2NDCYC signal may be set.

In block 1145, the internal second cycle RD clock generator 570 may generate one or more internal second clock signals for the read operation when the RD_CLK_2NDCYC signal is set.

In block 1150, the internal second cycle RD clock generator 570 may also generate a delayed RD_CLK signal after a duration of time sufficient to allow the read operation to complete has elapsed.

In block 1155, the reset logic 535 may output a reset signal to the SR latch 530 upon receipt of the delayed RD_CLK signal.

In block 1160, the SR latch 530 may reset the RW_CLK signal upon a receipt of the reset signal.

Referring back to FIG. 7, in block 730, the memory may perform a memory write when the RW_WRB signal indicates a write operation. Recall that the write can completed in one cycle. Thus, in this instance, the CLK signals received by the memory may simply be referred to as a CLK signal. The one cycle may be defined as a period or a duration of the CLK signal.

Figure 12:
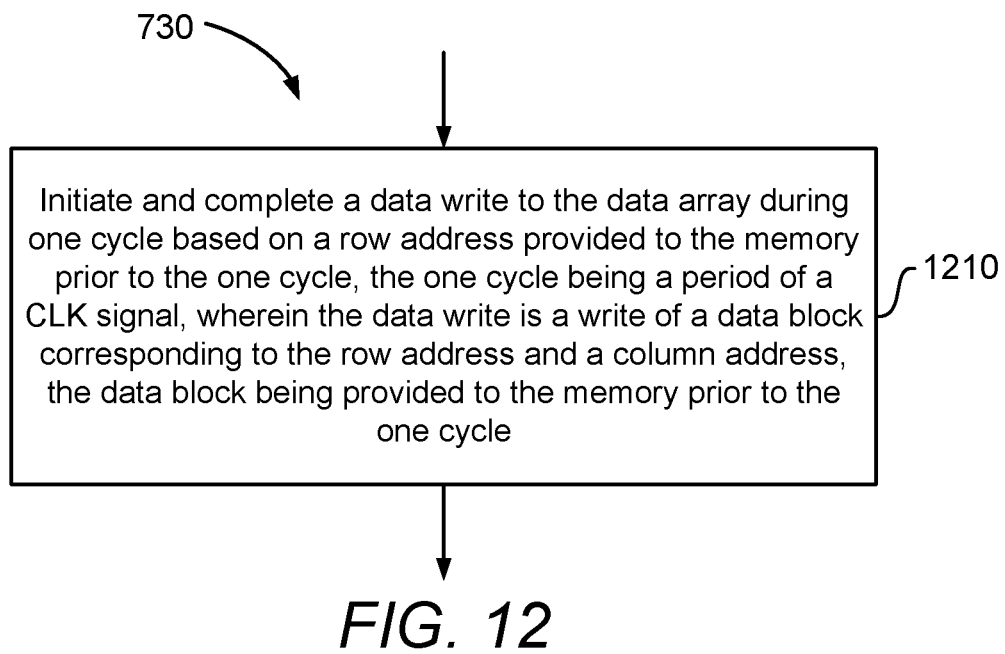

FIG. 12 illustrates an example process for implementing block 730. In block 1210, the memory may initiate and complete a data write to the data array 210 during one cycle based on a row address provided to the memory 200 prior to the one cycle.

Figure 13A:
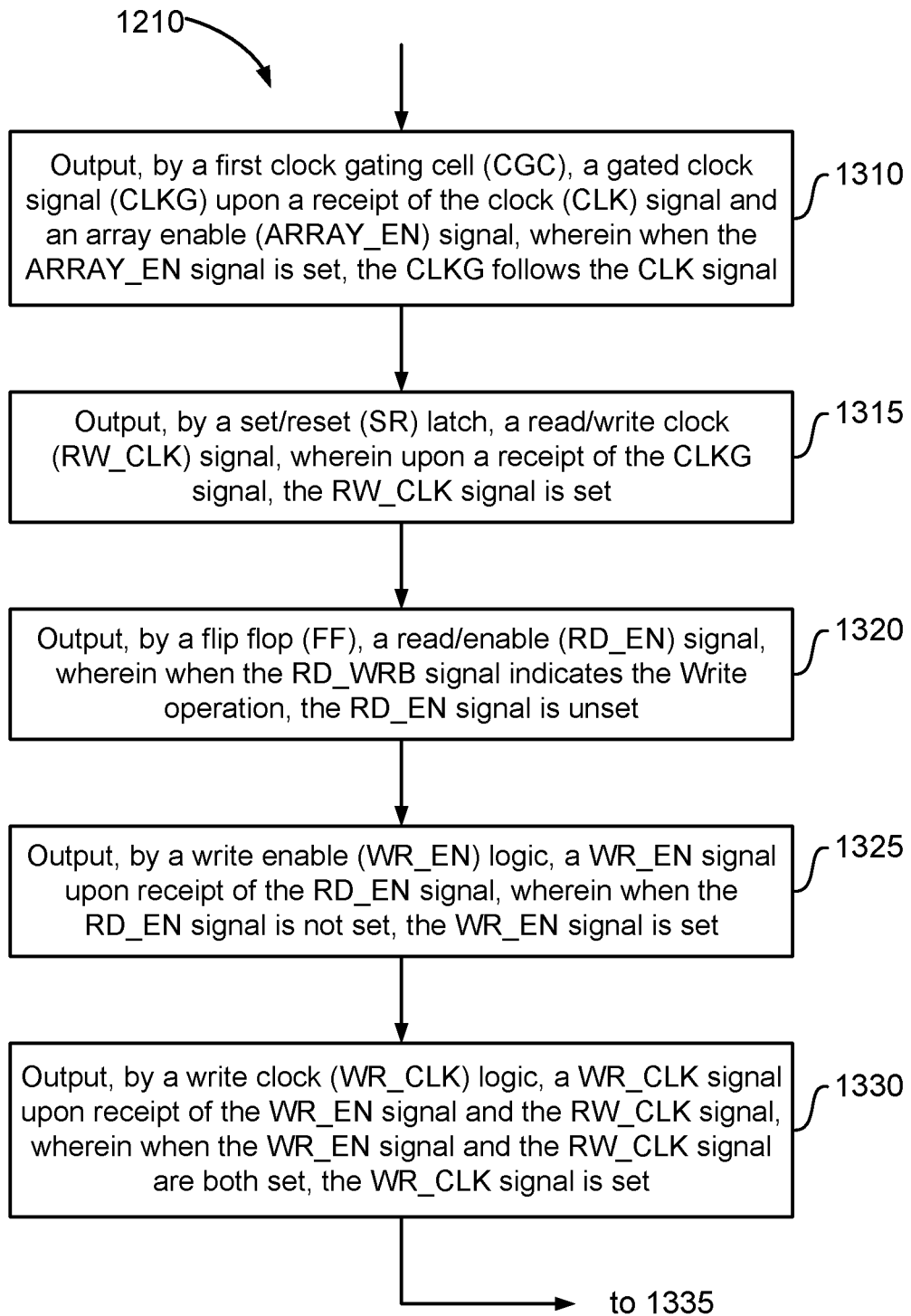
Figure 13B:
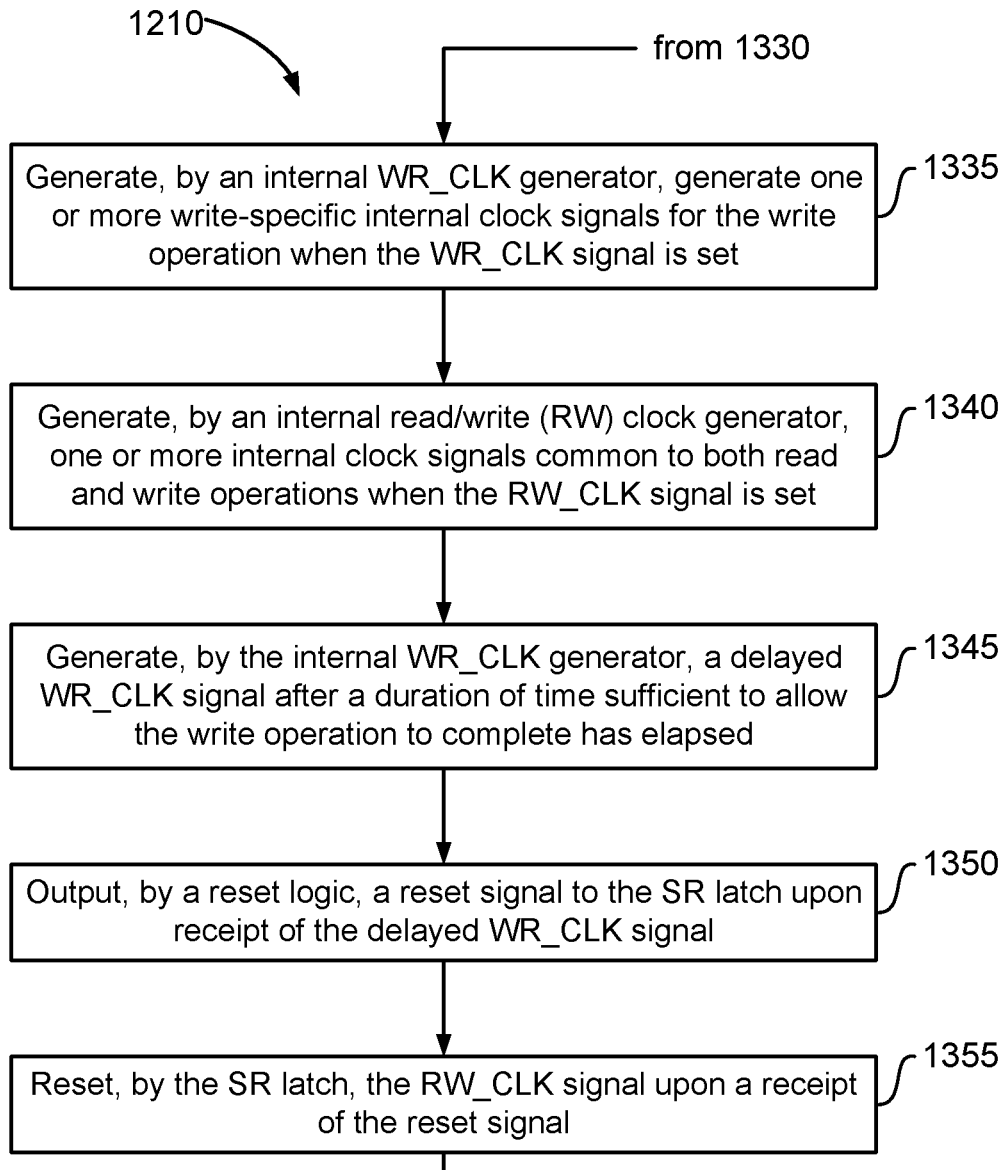

FIGS. 13A and 13B illustrate a flow chart of an example process for implementing block 730. The illustrated flow chart may be viewed as representing acts performed by the components of the access circuit 230. Note that the second CGC 515, the RD_CLK_1STCYC logic 550, the RD_CLK_2NDCYC 555, and the internal second cycle RD clock generator 570 need not be involved in write access. Since the second CGC 515 is not involved, the first CGC 510 may simply be referred to as a CGC 510 for write operation purposes.

In block 1310, the CGC 510 may output a CLKG signal upon a receipt of the CLK signal and an array enable (ARRAY_EN) signal. When the ARRAY_EN signal is set, the CLKG signal may follow the CLK signal.

In block 1315, the SR latch 530 may output the RW_CLK signal. Upon receipt of the CLKG signal, the RW_CLK signal may be set.

In block 1320, the FF 520 may output the RD_EN signal. When the RD_WRB signal indicates the write operation, the RD_EN signal may be unset.

In block 1325, the WR_EN logic 535 may output a WR_EN signal upon receipt of the RD_EN signal. When the RD_EN signal is not set, the WR_EN signal may be set.

In block 1330, the WR_CLK logic 545 may output a WR_CLK signal upon receipt of the WR_EN signal and the RW_CLK signal. When the WR_EN signal and the RW_CLK signal are both set, the WR_CLK signal may be set.

In block 1335, the internal WR_CLK generator 560 may generate one or more write-specific internal clock signals for the write operation when the WR_CLK signal is set.

In block 1340, the internal RW clock generator 565 may generate one or more internal clock signals common to both read and write operations when the RW_CLK signal is set.

In block 1345, the internal WR_CLK generator 560 may also generate a delayed WR_CLK signal after a duration of time sufficient to allow the write operation to complete has elapsed.

In block 1350, the reset logic 535 may output a reset signal to the SR latch 530 upon receipt of the delayed WR_CLK signal.

In block 1355, the SR latch 530 may reset the RW_CLK signal upon a receipt of the reset signal.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A memory, comprising:
   a data array comprising a plurality of data blocks addressable in rows and columns; and
   an access circuit configured to receive as inputs clock (CLK) signals and a read/write operation (RD_WRB) signal,
   wherein when the RD_WRB signal indicates a read operation, the access circuit is configured to:
     initiate a data read from the data array during a first cycle based on a row address provided to the memory prior to the first cycle, the first cycle being a period of a first CLK signal, and
     output a read data block at least by an end of a second cycle, the read data block being a data block of the plurality of data blocks corresponding to the row address and a column address, the second cycle being a period of a second CLK signal and subsequent to the first cycle,
   wherein there is no tag encoding to determine hit or miss,
   wherein the column address is not available prior to the first cycle, and
   wherein the data array is a single memory instance.

2. The memory of claim 1,
   wherein the data array is N-way associative such that there are M×N data blocks, M being a number of row addresses and N being a number of column addresses, and
   wherein the row address is m, m=0 . . . M−1, and
   wherein during the first cycle, the access circuit is configured to read N data blocks corresponding to the row address m.

3. The memory of claim 2, wherein during the first and second cycles, the access circuit is configured to:
   compare one or more of N tags associated with the N data blocks with an input tag provided to the memory,
   determine, when the comparison indicates that an nth tag of the N tags matches the input tag, an address n of the matching tag as the column address, n=0 . . . N−1, and
   output data block n of the N data blocks as the read data block.

4. The memory of claim 3, wherein the access circuit is configured to output the read data block during the second cycle.

5. The memory of claim 3, wherein the access circuit is configured to multiplex the data block n of the N data blocks.

6. The memory of claim 3, wherein in comparing the one or more N tags, the access circuit is configured to write to a hit/miss word comprising N bits, each bit of the hit/miss word corresponding to one of the N tags, each bit of the hit/miss word indicating whether the corresponding tag matches or does not match the input tag.

7. The memory of claim 6, wherein the access circuit is configured to multiplex the data block n of the N data blocks directly from the hit/miss word without further encoding and decoding of the hit/miss word.

8. The memory of claim 1, wherein when the RD_WRB signal indicates a write operation, the access circuit is configured to:
   initiate and complete a data write to the data array during one cycle based on a row address provided to the memory prior to the one cycle, the one cycle being a period of a CLK signal,
   wherein the data write is a write of a data block corresponding to the row address and a column address, the data block being provided to the memory prior to the one cycle.

9. The memory of claim 1, wherein the memory is a level-2 (L2) cache.

10. The memory of claim 1, wherein the first and second cycles are successive cycles.

11. A method of accessing a memory comprising a data array comprising a plurality of data blocks addressable in rows and columns, the method comprising:
receiving clock (CLK) signals and a read/write operation (RD_WRB) signal; and
performing a memory read when the RW_WRB signal indicates a read operation, the memory read comprising:
initiating a data read from the data array during a first cycle based on a row address provided to the memory prior to the first cycle, the first cycle being a period of a first CLK signal; and
outputting a read data block at least by an end of a second cycle, the read data block being a data block of the plurality of data blocks corresponding to the row address and a column address, the second cycle being a period of a second CLK signal and subsequent to the first cycle,
wherein there is no tag encoding to determine hit or miss,
wherein the column address is not available prior to the first cycle, and
wherein the data array is a single memory instance.

12. The method of claim 11,
wherein the data array is N-way associative such that there are M×N data blocks, M being a number of row addresses and N being a number of column addresses, and
wherein the row address is m, m=0 . . . M−1, and
wherein initiating the data read comprises reading N data blocks corresponding to the row address m during the first cycle.

13. The method of claim 12, wherein outputting the read data block comprises:
comparing one or more of N tags associated with the N data blocks with an input tag provided to the memory;
determining, when the comparison indicates that an nth tag of the N tags matches the input tag, an address n of the matching tag as the column address, n=0 . . . N−1; and
outputting data block n of the N data blocks as the read data block.

14. The method of claim 13, wherein the read data block is output during the second cycle.

15. The method of claim 13, wherein outputting the read data block comprises multiplexing the data block n of the N data blocks.

16. The method of claim 13, wherein in determining the address n of the matching tag comprises:
writing to a hit/miss word comprising N bits, each bit of the hit/miss word corresponding to one of the N tags, each bit of the hit/miss word indicating whether the corresponding tag matches or does not match the input tag.

17. The method of claim 16, wherein the outputting the data block n comprises multiplexing the data block n of the N data blocks directly from the hit/miss word without further encoding and decoding of the hit/miss word.

18. The method of claim 11, further comprising:
performing a memory write when the RW_WRB signal indicates a write operation, the memory write comprising:
initiating and completing a data write to the data array during one cycle based on a row address provided to the memory prior to the one cycle, the one cycle being a period of a CLK signal,
wherein the data write is a write of a data block corresponding to the row address and a column address, the data block being provided to the memory prior to the one cycle.

19. The method of claim 11, wherein the memory is a level-2 (L2) cache.

20. The method of claim 11, wherein the first and second cycles are successive cycles.

* * * * *